April 19, 1966  D. B. BINNIX  3,246,756
METHOD AND APPARATUS FOR UNIFORMLY DIFFUSING
MINERAL SUSPENSION FLUID
Filed Dec. 19, 1962  4 Sheets-Sheet 1
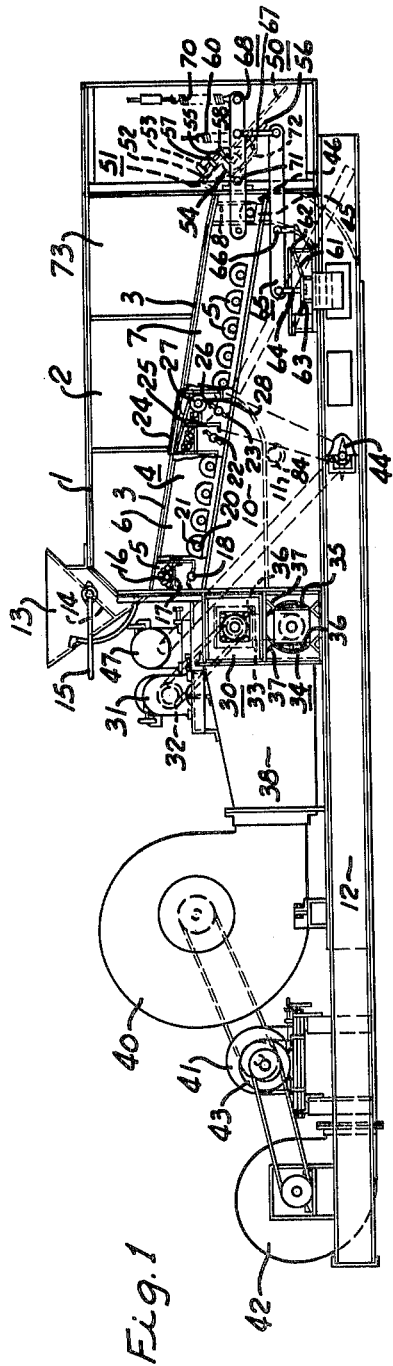
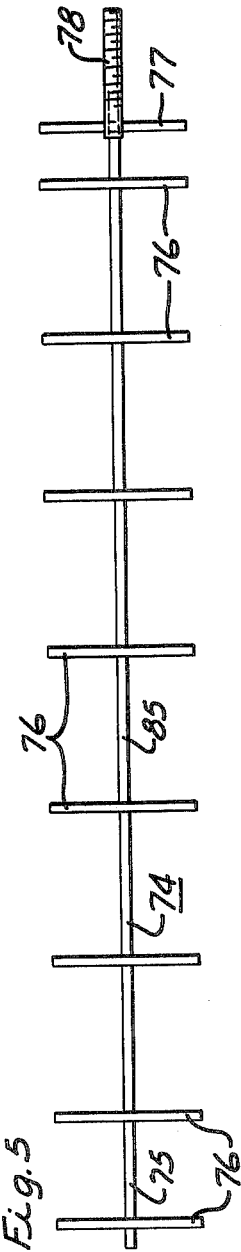
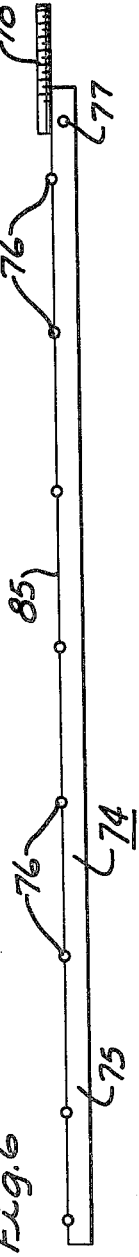
INVENTOR.
DONALD B. BINNIX
BY
HIS ATTORNEY

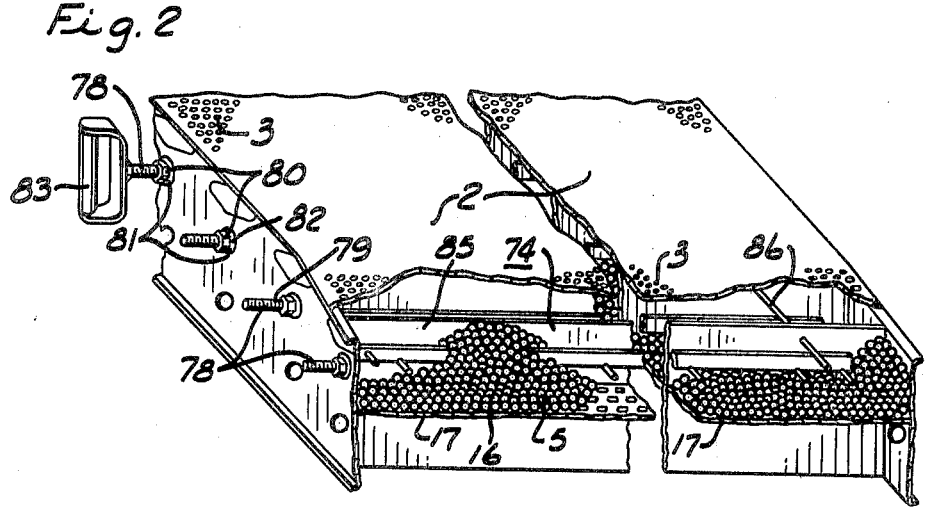
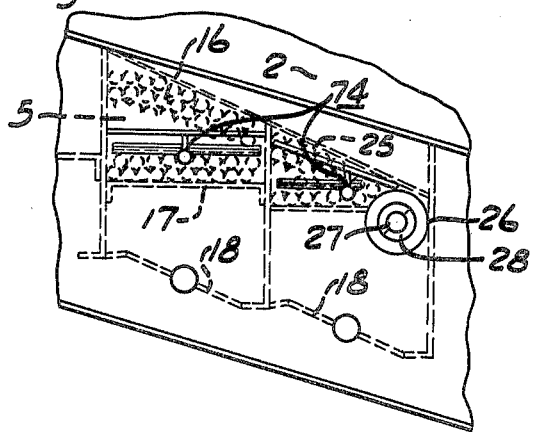
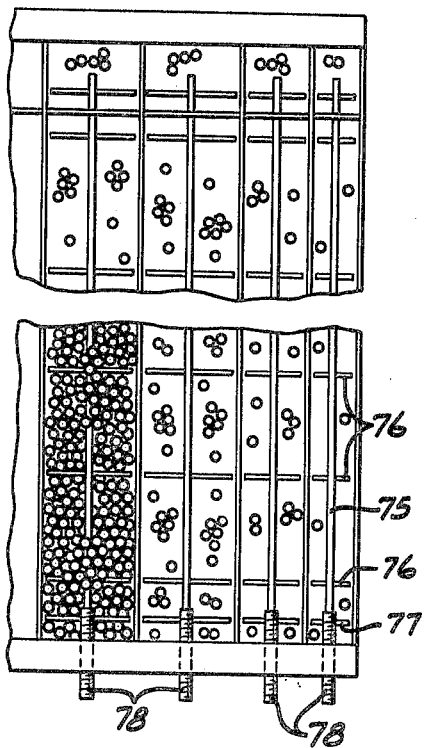

April 19, 1966     D. B. BINNIX     3,246,756
METHOD AND APPARATUS FOR UNIFORMLY DIFFUSING
MINERAL SUSPENSION FLUID Filed Dec. 19, 1962     4 Sheets-Sheet 3

INVENTOR.
DONALD B. BINNIX
BY
HIS ATTORNEY

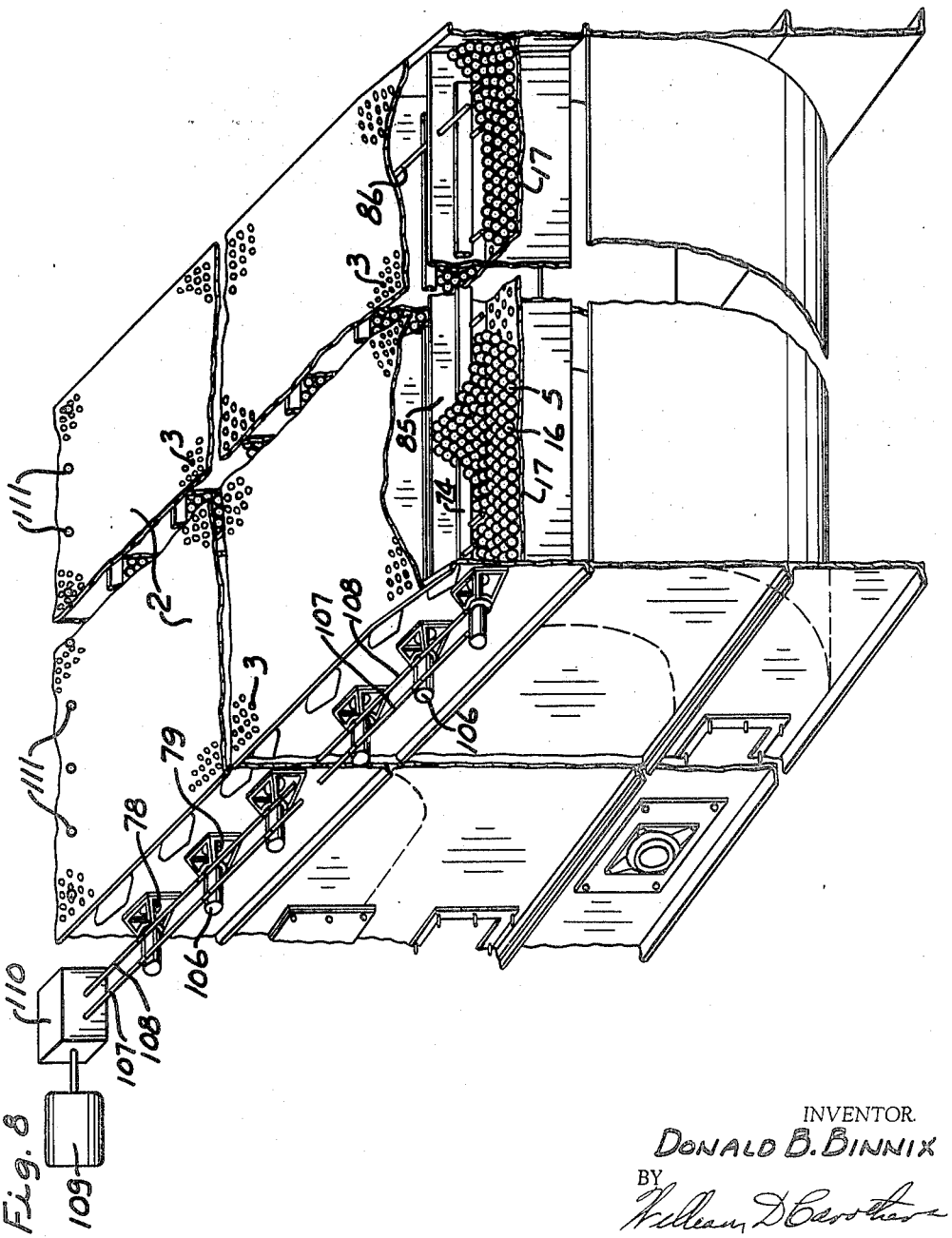

United States Patent Office 3,246,756
Patented Apr. 19, 1966

3,246,756
METHOD AND APPARATUS FOR UNIFORMLY
DIFFUSING MINERAL SUSPENSION FLUID
Donald B. Binnix, % Ridge Equipment Co.,
Fallentimber, Pa.
Filed Dec. 19, 1962, Ser. No. 245,889
12 Claims. (Cl. 209—475)

This invention relates generally to the separation of minerals by pneumatic stratification and more particularly to the method and apparatus for uniformly diffusing the fluid in suspending the mineral to produce the stratification of the latter.

Pneumatic stratification is not new in the art and it is frequently employed with a chamber containing a downwardly sloping screen under which is disposed a series of independent marble packed cells through which the air or gas employed for suspending the mineral bed above the screen through which the air or gas employed must pass in suspending the mineral bed above the screen in the chamber which suspension permits a mineral bed to flow downwardly over the screen to the lower end where the different strata are separated in accordance with their specific gravity. The marble packed cells actually diffuse the gas and prevent any channelling or other disrupting conditions in the stratification of the mineral being pneumatically suspended as it flows downwardly over the screen and constant upwardly flowing suspension fluid. In separating slate, rock, and other minerals of heavier specific gravity from that of coal there is a tendency for the fines whether they be good or bad to filter down through the suspension fluid, through the screen, and into the marble packed cells disposed under the screen. The marble packed cells create a uniform diffusion of the air supplied in flowing upwardly through the screen to suspend the mineral bed and this precipitation of fines will eventually connect in the marble pack building up a dust barrier that will eventually affect the uniformity of the diffusion created by the marble pack. In order to clean these marble packs it is necessary to interrupt the operation of the machine, remove the marbles and clean the cells and the marbles and replace the same or to scrub or wash the marbles in place. This necessitates not only the down time of the machine but also requires additional equipment to remove, renovate, replace or to scrub the marbles in place. It not only results in an increased expenditure in equipment but also in manpower.

The principal object of this invention is the provision of a method and apparatus for cleaning the marble packs without disassembling the machine and when the machine is either idle or doing the operation of the same.

Another object is the provision of a simple marble displacing device in a pneumatic mineral stratification machine, which may be manually or automatically operated for the purpose of moving the marbles in a pack and thereby causing any precipitant to be dislodged therefrom and removed thereby maintaining a uniform diffusion of the upwardly flowing gas passing through the marble pack for the purpose of properly suspending the mineral bed so that it may more efficiently produce stratification between the minerals of different specific gravity as the suspended bed flows downwardly to the positions where the minerals of different specific gravity are separated from each other.

Another object is the provision of a control for periodically displacing or vibrating the marble pack to clean the same and maintain a uniform diffusion of the gases flowing therethrough.

Another object is the provision of a control for displacing or otherwise moving or vibrating the marbles within a marble pack in accordance with the diffusing pattern issuing from the marble pack. In some instances where the pneumatic stratification apparatus is quite wide there can be a tendency for the diffusion of the upwardly flowing air through the marble pack to change its pattern on one side or in the center of the transverse dimension of the pack which will effect an improper diffusion and actuate a control to vibrate or otherwise move the marbles within the pack to clean the same.

Thus the frequency of the operation may be determined by an operator who manually cleans the individual marble packs or periodically by a timer which cleans a series or all of the marble packs simultaneously or is effective in cleaning a selection or all of the marble packs due to an improper diffusion pattern. In this way the maze pattern may be made to uniformly diffuse the fluid under pressure in suspending the mineral bed. This not only produces a more uniform flow of air in this maze pattern but also increases the efficiency of the operation of the stratification of the minerals and a continuous flow distribution of the fluid through the machine even though the different marble packs in the different cells are required to pass greater quantities of air in the same period of time than that of other marble packs owing to the increased concentration of minerals of heavier specific gravity. This is more particularly true adjacent the lower end of the bed where the minerals in the lower strata are considerably more dense and require increased flow of fluid to maintain the bed suspended.

Another object is the provision of a rake that is supported for reciprocation through the marble bed and is provided with tines that are effective in moving the adjacent marbles which in turn actually affect the movement of all the marbles in the bed for the purpose of cleaning the same.

Another object is the provision of a manual handle for operating each rake.

Another object is the provision of a hold down to prevent the rake from changing its relative postiion when reciprocating from the marble pack in the cell.

Another object is the provision of a pneumatically actuated device for vibrating and moving the marbles in the marble pack periodically or due to the maze pattern in the flow of fluid therethrough in suspending the mineral bed for stratification of the minerals therein.

Other objects and advantages of this invention appear hereinafter in the following description and claims.

The accompanying drawings show for the purpose of exemplification without limiting the invention or claims thereto, certain practical embodiments illustrating the principles of this invention wherein:

FIG. 1 is a view in side elevation of a pneumatic stratifying machine with parts in section.

FIG. 2 is a sectional view of the screen and marble pack below the mineral bed with parts broken away.

FIG. 3 is a horizontal view in section showing the disposition of shakers within the marble pack in the pneumatic stratifier.

FIG. 4 is a longitudinal view in section showing the position of the shaker within the marble packs.

FIG. 5 is a plan view of the shaker.

FIG. 6 is a view in side elevation of the shaker shown in FIG. 5.

FIG. 8 is a perspective view with parts broken away showing a common reciprocator fluid operated for actuating the shakers.

Figure 7:
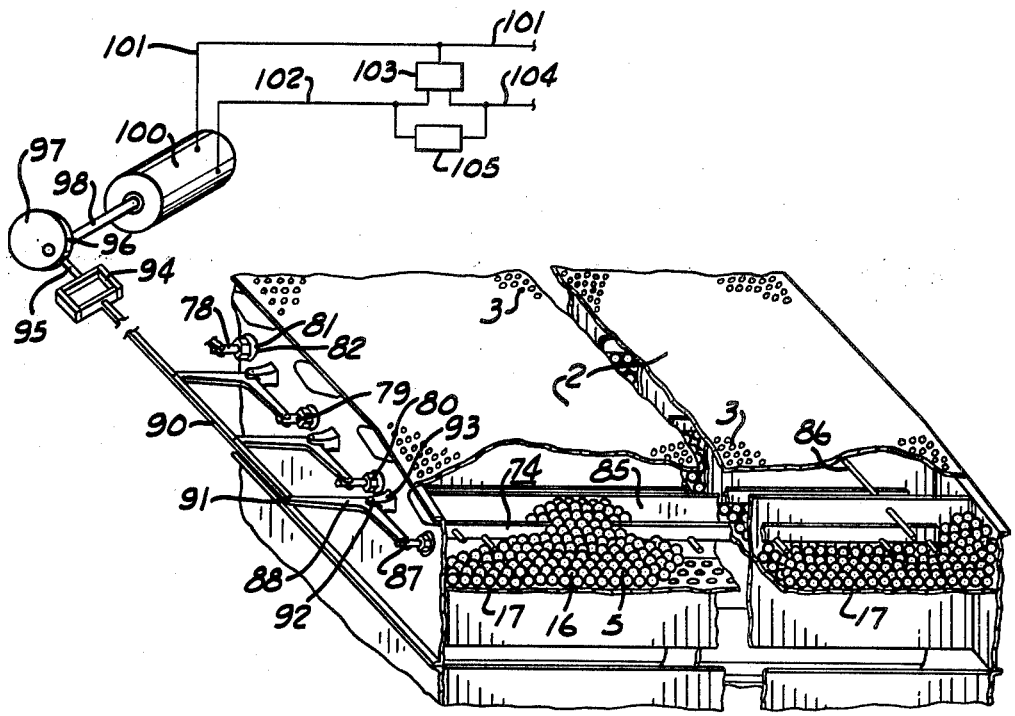
FIG. 7 is a perspective view with parts broken away showing a common reciprocator mechanically operated for actuating the shakers.

Referring to FIG. 1 of the drawings the pneumatic stratifier comprises the enclosure 1 being separated in five different chambers, the material chamber 2 the bottom of which contains the sloping pneumatic screen 3, the second chamber 4 containing a seires of cells 5 which separate the under side of the screen 3 in seven cells for the first section 6 for the second section 7 there are six cells 5 and in the third section 8 there are two cells. The third chamber is a pneumatic chamber 10 that supplies the air to the first section 6 of the cells 5. The fourth chamber 11 is a pneumatic chamber that supplies air to the second section 7 of the cells 5 and the fifth chamber 12 is a pneumatic chamber that supplies air to the last two cells in the section 8. Thus each of the five chambers within the enclosure 1 provides a function to increase the volume and pressure of the air downwardly along the pneumatic screen 3 to the discharge end.

Chamber 2 is supplied with a mineral such as run of the mine coal which is preferably sized from zero to three-quarter inch that is dumped in the hopper 13 the hopper gate 14 of which is adjustably positioned by the operating handle 15. The limitations of the movement of the gate 14 are shown in the drawing.

The coal proceeds down into the chamber 2 and along the screen 3 and each cell 5 under the screen is divided into two sections, the top section that contains a marble pack which consists of a pack of glass marbles 16 that diffuse the air flowing upwardly through the cell and through the screen 3 to suspend the coal and stratify the same. The marbles 16 are supported on a large screen mesh 17 and the marble pack or bed will vary in depth in the consecutive cells from the beginning of the screen to the discharge thereof. More marbles are provided in the initial cells than in the end cells because the marbles have the effect of not only diffusing the air but also diminishing the volume and pressure of the air to the screen 3 as the pack is increased in depth. Each cell also contains a manually operated vane or valve 18 pivoted on the shafts 20 and provided with an indicator such as shown at 21. The vanes or valves 18 are employed to also regulate the amount of air admitted to each cell. Thus the adjustment of the vanes or valves 18 together with the depth of the marble pack are determining factors in the amount of air that is admitted to that section of the screen 3 supplied by each particular cell 5 for determining the pneumatic suspension of the body of material such as coal.

When the run of mine coal enters this stratifier the particles of heavier specific gravity such as slate and rock and sulphur balls and the like are interspersed throughout the material but as the material is suspended by the air these heavier particles drop to the lower part of the screen; whereas the lighter coal particles stay at the top of the bed of pneumatically suspended coal. As the bed moves down the screen the heavier parts all collect at the under side of the bed close to the screen and become very dense which requires a greater volume of air and a higher pressure of air to suspend the bed which is compensated for by separating the chambers 10, 11 and 12.

As the bed reaches the cells 22 and 23, a special screen is provided as indicated at 24 over these cells and which permits the entry of —3/16" reject off the bottom of the suspended coal bed moving thereunder. These rejects are the heavy particles initially separated out from the bed and have not had a sufficient time to become too dense and therefore are more readily removed through the screen 24 from whence it drops on the lower screen 25 and is conveyed to the transverse pipe 26 through the opening 27 and is conveyed laterally by the screw 28. If these —3/16" rejects were permitted to be conveyed further along the pneumatically suspended bed of coal the increased air pressure from this point on would have the tendency of sending these ten mesh rejects higher in the pneumatically suspended coal bed and thus create a condition where it would be difficult to insure the removal of a high percentage of the —3/16" rejects at the end of the bed. The separation is therefore improved by this intermediate draw-off of the —3/16" rejects before the air volume and pressure becomes too high to cause these rejects to intermingle with the coal. It will be noted that the cells 22 and 23 are at the end of the air chamber 10 which is the first chamber of the system. The chamber 10 is supplied with air through the rotary valve 30 which is driven by the variable speed motor 31 and reducer mechanism through a chain 32. A second chain 33 drives the lower rotary valve 34. The rotary valves 30 and 34 are the same and have spherical plug members as indicated at 35 with a central passageway 36. The spherical portions of the plug 35 of the valve cooperate with the adjustable port members 37 of which there are four. It will be noted in the drawings that the same motor driving the two rotary valves 30 and 34 control the movement of air therethrough at 180° out of phase from each other as the port 36 of the upper valve plug is shown in a horizontal position while the port 36 of the lower valve plug is shown in a vertical position. In other words, while the valve 30 has its passage 36 so as to let the maximum amount of air from the chamber 38 to the chamber 10 as shown, the valve 34 closes and prevents any passage of air from the chamber 38 to the chamber 11. Thus upon the rotation of both of the valves 30 and 34 the air supplied to the cells 5 is pulsated according to the revolutions per minute of the rotary valves and since these valves are operated simultaneously but at 180° out of phase with each other, the pulsation of air in pneumatically suspending the initial portion of the coal bed is also 180° out of phase from the second portion which is indicated by that portion of the pneumatically suspended coal over the cell 7 fed by the chamber 11. This pulsation not only aids in the suspension of the bed but provides a movement that allows the particles making up the coal bed to arrange themselves in stratification throughout the depth of the bed in accordance with the specific gravity of each of the particles. Thus not only the size and depth of the marbles in the marble pack 16 but also the adjustment of the valves or vanes 18 function to pneumatically suspend the coal bed but the number of air pulsations created by the rotary valves 30 and 34 likewise have an effect in the pneumatic suspension of the coal bed that permits the particles of different specific gravity to reach their own level within the bed. This too is further affected by the size and the number of cells pulsated by each of the valves. One thus has many variables which may be adjusted to provide an improved pneumatic suspension of the coal bed.

The chamber 38 as shown in FIG. 1 is supplied with air from the fan indicated at 40 which is in turn driven by a motor 41. The chamber 12 in turn is supplied with air from the fan 42 driven by the motor 43. The motors 41 and 43 are likewise variable in speed so as to permit a change in the volume of air produced over a given time which is a sixth factor in the control of the supply of air to pneumatically suspend the bed of coal which is thus caused to move down the sloping screen 3 due to gravity and because of this pneumatic pulsating suspension.

The chamber 12 is provided with the rotary valve member 44 which is a single bladed valve that imparts two pulsations per revolution from the chamber 12 to the end cells 45 and 46. The valve 44 is driven by means of the variable speed motor and reducer 47 and this motor is also employed to drive the screw conveyor 28 as shown.

Thus not only each of the consecutive cells 5 all the way down the screen 3 provide for the passage of an increased volume of air progressively down the screen but the last two cells require a considerably greater amount of air than the cells in the chamber 7 because the bed of coal by this time is substantially all properly stratified with the heavy specific gravity rejects lying along the bottom portion of the bed being substantially uniform in depth and the air supplied through the cells 45 and 46 of the chamber 8 must be materially greater in volume to pulsate the bed at this position for which reason the chamber 8 is supplied with air from an independent source.

At the end of the chamber 2 a discharge chute 50, which is rather steep in its inclination, has a lip or dam 51 at its upper end. This dam has upper and lower projections 52 and 53 that fit on the top and bottom of the chute 50 which permit the dam member 51 to be removable and changed for different types of run of the mine coal. It will be noted that the bottom edge of the dam is spaced from the screen 3 and this spacing permits the flow of the reject material from the under side of the stratified bed; whereas the coal will flow over the top of the dam 51 and pass down the chute 50 cleaned of all its reject. The chute 50 rests on the cam 54 which is mounted on the shaft 55 rotated by the hand lever 56. Thus different positions of the lever 56 will cause the cam 54 to vary the height of the chute 50 and thus the opening between the bottom edge of the dam 51 and the screen. A stop 57 prevents the member 58 on the shaft 55 to limit the movement of the lever and the spring 60 is attached to the lever 56 to maintain the movable abutment 58 against the stop 57 and thus at all times maintain a constant opening between the bottom of the dam 51 and the screen 3. If for some reason a large chunk of material descends in the pneumatically suspended bed and tends to clog this opening under the dam one need only to depress the lever 56 and the cam 54 will raise the chute 50 and the dam to permit the large piece that is blocking the dam to pass therethrough to reject. The mere release of the handle 56 causes the spring 60 to move into its fixed position against the stop 57.

The air chamber has exposed thereto a servomotor of pneumatic type containing a flexible diaphragm 61 which is fastened between the annular rings 62 and the center of the diaphragm is provided with the plates 63 which permit it to be attached by the link 64 to the lever 65. The lever 65 is fulcrumed at 66 and its other end is provided with the link 67 that connects to the second lever 68 of the system. The link 67 may be adjusted along the levers 65 and 68 to provide for different weights of the reject material. The end of the lever 68 is supported by the spring 70 and its intermediate portion is fulcrumed as indicated at 71. This fulcrum can be changed in its position along the lever 68 by means of the many holes provided. Thus the lever 68 is adjustable relative to the lever 65 as well as the link 67.

The fulcrum 71 of the lever 68 carries the refuse gate 72 which receives all the refuse that flows under the dam 51. The refuse is held on the gate by reason of the lever system and is opened only when the air effective on the diaphragm 61 is of sufficient pressure which indicates that it is having a very difficult time pneumatically suspending the bed of coal just above the dam 51. As the reject strata in the coal bed on the screen 3 becomes very dense, the pressure in the chamber 12 increases. This dense material is, of course, a measurement of the weight of the reject and since the high density creates an increased pressure on the diaphragm 61 the lever 65 will be rotated clockwise and pull the lever 68 against the tension of the spring 70 and will open the gate 72 and allow more or less reject to flow from the end of the screen 3.

The pulsating air pressure in the chamber 12 is effective to vibrate the lever system in the period of the pulsations of air which vibration makes the lever system sensitive to slight variations in pressure and the gate 72 is thereby maintained open to the proper amount for the exit of the reject at a speed correlated with the density of the reject in the last portion of the screen. In this manner a very high degree of accuracy is maintained in the separation of reject from the coal by this gaseous suspension stratifier.

The sides 73 of the chamber 2 may be made of a clear plastic when the stratifier is employed for the separation of rejects from coal. Such plastic side walls may be made of methyl methacrylate and will last a considerable length of time which is rather difficult to understand as one would think that such a material would become scratched by the coal and other particles traveling therethrough. However, the methyl methacrylate is found to stand up far better than glass which is much harder and it permits the operator to frequently view the stratification of the reject in the pneumatically suspended coal bed. It is believed that the plastic is lubricated by the coal and does not set up a charge that will hold the dust particles which permits the bed to be readily observed through plastic rather than through glass.

Each of the cells 5 with their marble packs 16 is provided with a shaker marble displacement member 74 which is illustrated in detail in FIGS. 5 and 6 wherein each shaker is provided with a longitudinal bar 75 having a series of transverse rods 76 secured thereto. The end transverse rod 77 is adjacent the operating member 78 which is threaded for the purpose of receiving the nuts 80 and washer members 81 and 82. A similar nut is provided on the inside of the chamber 2 so as to permit the nuts to be turned up and compress the rubber washer 82 for the purpose of sealing the chambers. Where each of the operating members 78 extend through the wall of the chamber 2 they are provided with a threaded sleeve 79 engaged by the nut 80. The washer 81 being next to the nut is made of metal, the washer 82 is against the wall of the chamber 2. The outer end of the operating section 78 is provided with a handle 83 which may be employed to move the shaker rack 74 back and forth within the marbles. The transverse rods 76 and 77 actually move the marbles that they are directly engaging which in turn move the other marbles in the cell which by reciprocating the shaker rack 74 enables one to cause all of the marbles within each cell to be distributed or moved and any of the fines or other materials that have precipitated through the screen 3 to the marble pack will descend through the marble pack and pass outwardly through this screen 17 which supports the marble pack. This material will drop downwardly past the valves 18 to the bottom of the chambers 11 or 12 from whence they may be removed through trap doors or they may be removed laterally on transverse conveyor sections 84 from the bottom of the respective chambers.

It will be noted that the top edge 85 of the longitudinal bar 75 is continuous and smooth for the purpose of being engaged by the rod 86 which extends downwardly and longitudinally of the bed and passes through the partitions separating the marble pack chambers 5 and merely rests on top of each of the vibratory shaker members 74 adjacent the far end of the machine. Thus the rod 86 together with the threaded operating section 78 maintains this shaker at the same height in each of the cells. The shaker would have a tendency to rise when moved back and forth through the marbles, but the bar and the threaded member 78 limit the height of this shaker member within the marbles. Nevertheless the shaker member 74 has some vertical movement which aids in its effect in pumping, rotating or otherwise distributing by movement all of the marbles within each cell. Each of the marble cells 5 are substantially filled and if it is desirable to have less marbles in the cells adjacent the discharge and in the cells' initial end it is better to change the size of the cells rather than to make the cells the same size and put less marbles in them. Thus by loosening the external nut 80 one may grasp the handle 83 and reciprocate the vibratory shaker member or rack 74 and thoroughly distribute all the marbles in that cell causing any infiltration of coal or foreign particles to pass downwardly through the screen 17 to the bottom of the chamber. As illustrated in FIGS. 3 and 4 the widths of the transverse bars or rods 76 and 77 will vary in accordance with the width of the cells, but they will extend laterally substantially to the outer walls to define the walls of the marble pack. As illustrated in FIGS. 3 and 4 these cells may not only vary in depth, but they also vary in width; in any event they should be substantially fully packed leaving only enough room at the top to permit the movement of the marbles when the shakers or vibrators are reciprocated through the marbles causing all the marbles to work one against the other and create an upwardly sifting motion through the pack.

As shown in FIG. 7 the sleeves 79 which seal the operating rods 78 in the wall of the chamber 2 function as a bearing support for the sleeves which in turn function as a reciprocal bearing for the section 78 of the vibratory shaker 74. Each of the members 78 are provided with a transverse opening to receive a pin 87 which pivotally secures one arm of the bell crank lever 88 to the member 78, the other arm of the bell crank lever being pivotally secured to the reciprocating operating rod 90 by the pin 91. The bell crank lever is secured as indicated at 92 to the pivotal bearing member 93 attached to the side of the machine. The rod 90 extends rearwardly to the cross head member 94 which is connected by the pitman 95 to the strap member 96 of the eccentric 97. The eccentric 97 is mounted on the end of the shaft 98 of the motor 100. The motor 100 is a variable speed motor and is also controlled by the lines 101 and 102 the latter of which is controlled by the timer switch 103 that is supplied from the lines 101 and 104 and also controls the supply of current through the line 102 to the motor 100. The timer 103 may be set to periodically energize the motor for a given length of time for the purpose of oscillating each of the vibratory shakers. The bell crank levers may be T shaped so as to operate adjacent shakers 74 in opposite directions at the same time and thus employ a T-shaped bell crank lever for every pair of vibratory shakers 74.

A switch 105 may be actuated to take the place of the operation of the timer mechanism 103 and thus enable one to continuously operate or selectively operate the vibratory shakers 74 for any predetermined length of time. This switch 105 is thus a manual control of the electric motor 100, but thus provides a manual control for the same.

In the structure of FIG. 8 the vibratory shaker members 74 each independently actuated by their own fluid motors 106 that are supplied with fluid by the lines 107 and 108. These lines may be connected so that they would be alternately connected to supply fluid pressure and fluid discharge and thus simultaneously reciprocate the vibratory shaker 74. Again the lines 107 and 108 may be controlled by the motor 109 which in effect functions as a timer in that the motor 109 will not only control the operation and timing of the valve 110 but will also control the duration of its operation thus giving the same type of control as that of a mechanically operated device shown in FIG. 7.

Figure 9:
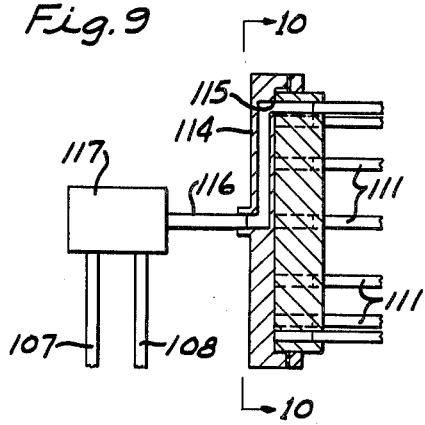
FIG. 9 is a view in section illustrating a scanner for determining the degree of non-uniform diffusion across or along a cell for the purpose of determining the control of the shaker.
Figure 10:
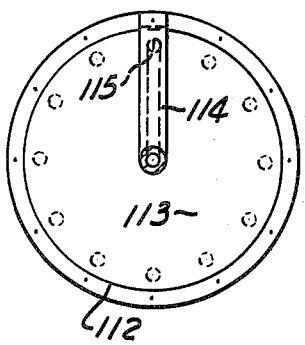
FIG. 10 is a sectional view taken along the 10—10 line of FIG. 9.

In FIGS. 9 and 10 the control is connected by means of the series of tubes 111 that are connected to each or selected chambers 5 and all the way across the same as indicated in FIG. 8. These tubes being open to the chamber 5 will pick up the relative pressure of air in the chamber during its operation. This pressure is conducted from the tubes 111 back to the annular control member 112 where each tube ends in a circular face 113 which is engaged by a rotary valve member 114. The rotary valve member will maintain each of the tubes 111 closed with the exception of the single tube which is open through the port 115 that passes to the center of rotation and out through the connection 116 where it is effective on the control member 117 in the nature of a valve for supplying alternate air and exhaust to the pipe members 107 and 108. As the disc 114 rotates the port 115 when registering with one of the tubes 111 which does not have sufficient air pressure owing to the clogging of the marble pack of fine material will be effective on the control member 117 to supply alternate pressure and exhaust into the pipes 107 and 108 and operate all of the shakers or one of the shakers depending upon the extent of the control. With this structure one may be assured that the mazed pattern produced by the marble pack within that cell is uniform throughout the width of the machine or the mineral beds suspended thereover. Thus any variation in the maze pattern across the machine may require that that particular cell or all of the cells be agitated or vibrated in such a manner as to insure that a uniform maze pattern will be the same across the width of the mineral bed and in each of the cells that are deemed to be important in controlling the vibration of the marble packs for the purpose of maintaining a uniform diffusion of the air passing upwardly therethrough to thereby provide a better controlled flow of the mineral in the bed downwardly and induce a more accurate stratification of the minerals of different specific gravities within the bed.

I claim:

1. The method of separating minerals of different specific gravity which consists of the steps of suspending a downwardly sloping mineral bed by supplying a fluid under pressure upwardly therethrough for the full length of the bed to move the mineral bed downwardly and stratify the same, separating the stratified minerals adjacent the lower end of the mineral bed, providing a substantially full marble pack to supply a maze pattern to uniformly diffuse the fluid under pressure before it flows upwardly through the mineral bed, and directly engaging selected of the marbles in the pack to directly displace all the marbles in the pack to agitate the maze pattern to maintain a uniform diffusion of the upwardly flowing fluid under pressure and to precipitate therefrom foreign particles that would disrupt the uniformity of the diffusion of the upward fluid flowing under pressure supplied to the mineral bed.

2. The method of claim 1 which also includes the step of periodically directly engaging selected of the marbles in the pack to directly displace all the marbles in the pack to agitate the maze pattern to effect a periodic precipitation of foreign particles from the maze pattern.

3. The method of claim 1 which also includes the step of continuously directly engaging selected of the marbles in the pack to directly displace all the marbles in the pack to agitate the maze pattern to effect a continuous precipitation of foreign particles from the maze pattern.

4. A gaseous suspension mineral bed stratifying machine comprising a chamber, a downwardly sloping screen in said chamber, a plurality of independent marble pack cells substantially filled with marbles and mounted in said chamber under said screen and through which the gas must pass to said screen for suspending the mineral bed, a catch area in said chamber under said marble pack cells, means to supply a flow of gas under pressure to and through said marble pack cells to effect a suspension to flow and stratify a mineral bed as it moves down over said screen to stratify the same, means for separating the mineral bed strata, marble displacing means in the marble pack positioned to directly engage selected of the marbles in the pack which marbles directly displace all the marbles in the cell, and means to actuate said marble displacing means to move the marbles in said cells and shake precipitated minerals down through the marbles to the catch area where they are removed.

5. The method of cleaning a marble pack for diffusing air used to suspend a downwardly sloping mineral bed for stratifying and separating the minerals therein consisting of the steps of providing a screen enclosed and substantially full marble pack under the downwardly sloping mineral bed to supply a uniform maze pattern and uniformly diffuse the air under pressure traveling upwardly before it flows through the mineral bed, supplying air under pressure upwardly through the marble pack and through the downwardly sloping mineral bed for the full length thereof to suspend and to move the mineral bed downwardly along the slope and to stratify the same separating the stratified minerals adjacent the lower end of the mineral bed, directly engaging selected of the marbles in the pack to directly displace the adjacent marbles causing them to displace all the marbles in the marble pack and precipitate therfrom particles that improperly deposit in the marble pack to re-establish the maze pattern of air and property suspend the downwardly sloping mineral bed and improve the stratification thereof for separation.

6. A device for restoring a uniform maze pattern of air under pressure traveling upwardly through a marble pack to properly suspend a flowing and stratifying downwardly sloping mineral bed in a pneumatic stratification separator which consists of cell means within the separator extending under the downwardly sloping mineral bed, a marble pack substantially filling said cell means, displacement means in said marble pack contained within said cell means to displace marbles adjacent thereto, and means for moving said displacement means to displace the marbles adjacent thereto which in turn displace all the marbles in said cell means to drop out the foreign matter and restore the maze pattern of air created by the marble pack.

7. A device for restoring a uniform maze pattern of air under pressure traveling unwardly through a marble pack in a pneumatic stratification separator to properly suspend a flowing and straifying downwardly sloping mineral bed in the pneumatic stratification separator which consists of, a series of divided cells within the separator having top and bottom screens and extending under the downwardly sloping mineral bed, a marble pack substantially filling each cell, a rack displacement means in said marble pack in each of said cells engaging the marbles adjacent thereto, and means for moving each rack displacement means to displace the marbles adjacent thereto which in turn displace all of the marbles in said cells to drop out the foreign matter and restore the maze pattern of air created by the marble pack.

8. The device for restoring a uniform maze pattern of air in claim 7 wherein said means for moving each rack displacement means includes a handle on each rack for manual operation.

9. A device for restoring a uniform maze pattern of air under pressure traveling upwardly through a marble pack in a pneumatic stratification separator to properly suspend a flowing and straifying downwardly sloping mineral bed in the pneumatic stratification separator which consists of a series of divided cells within the separator having top and bottom screens and extending under the downwardly sloping mineral bed, a marble pack substantially filling each cell, a rack displacement means in said marble pack in each of said cells, and means for moving each rack displacement means to displace the marbles adjacent thereto and move substantially all of the marbles in said cells to drop out the foreign matter and restore the maze pattern of air created by the marble pack, said means for moving each rack displacement means includes motor means connected to said racks to operate the same.

10. The device of claim 9 which also includes timer means to intermittently actuate said motor means.

11. The device of claim 9 wherein said motor means includes an independent motor for each rack, control means for actuating said motor means.

12. The device of claim 11 wherein said control means includes pressure responsive means connected to said cells for checking the cells to determine the operation of said motor means.

References Cited by the Examiner

UNITED STATES PATENTS

| | | | |
|---|---|---|---|
| 1,549,158 | 8/1925 | Smith | 55—296 |
| 1,598,644 | 9/1926 | Greene | 55—300 |
| 2,245,942 | 6/1941 | Stump | 209—475 |
| 2,513,960 | 7/1950 | Ore | 209—468 |
| 2,678,131 | 5/1954 | Dore | 209—466 |
| 2,703,630 | 3/1955 | Crowder | 55—300 |
| 3,065,853 | 11/1962 | Binnix | 209—468 |
| 3,090,180 | 5/1963 | Berz | 55—300 |

FOREIGN PATENTS 998,563  9/1951  France.

HARRY B. THORNTON, *Primary Examiner.*